(12) United States Patent
Weiss

(10) Patent No.: US 9,659,169 B2
(45) Date of Patent: **\*May 23, 2017**

(54) DIVIDING A DATA PROCESSING DEVICE INTO SEPARATE SECURITY DOMAINS

(71) Applicant: CellSec, Inc., Silver Spring, MD (US)

(72) Inventor: Yoav Weiss, Petach Tivka (IL)

( \* ) Notice: Subject to any disclaimer, the term of this patent is extended or adjusted under 35 U.S.C. 154(b) by 0 days.

This patent is subject to a terminal disclaimer.

(21) Appl. No.: 14/566,045

(22) Filed: Dec. 10, 2014

(65) Prior Publication Data

US 2015/0205952 A1    Jul. 23, 2015

Related U.S. Application Data

(63) Continuation of application No. 13/316,426, filed on Dec. 9, 2011, now Pat. No. 8,931,042.

(60) Provisional application No. 61/421,693, filed on Dec. 10, 2010.

(51) Int. Cl.
| | | |
|---|---|---|
| *G06F 21/53* | (2013.01) | |
| *G06F 15/16* | (2006.01) | |
| *G06F 21/00* | (2013.01) | |
| *G06F 21/62* | (2013.01) | |

(52) U.S. Cl.
CPC .............. *G06F 21/53* (2013.01); *G06F 15/16* (2013.01); *G06F 21/00* (2013.01); *G06F 21/6218* (2013.01); *G06F 2221/2105* (2013.01)

(58) Field of Classification Search
CPC .................................. H04L 9/00; G06F 15/16
USPC ............................. 726/1, 26; 713/201; 707/3
See application file for complete search history.

(56) References Cited

U.S. PATENT DOCUMENTS

| | | | |
|---|---|---|---|
| 2007/0174285 A1\* | 7/2007 | Dutta et al. ........................ 707/9 |
| 2009/0119541 A1\* | 5/2009 | Inoue et al. .................... 714/10 |

\* cited by examiner

*Primary Examiner* — Brandon Hoffman
*Assistant Examiner* — Samuel Ambaye
(74) *Attorney, Agent, or Firm* — David P. Lentini

(57) ABSTRACT

This invention creates separation between personal applications and corporate applications on a data processing device, so that both types of applications can run simultaneously while complying with all required policies. This enables employees to use their personal devices for work purposes, or work devices for personal purposes. The separation is created by dividing the data processing device into two or more "domains", each with its own policies. These policies may be configured by the device owner, an IT department, or other data or application owner.

24 Claims, 3 Drawing Sheets

DIVIDING A DATA PROCESSING DEVICE INTO SEPARATE SECURITY DOMAINS

1 BACKGROUND OF THE INVENTION

1.1 Field of the Invention

The disclosed invention relates to the field of computing, and more particularly, to aspects of computing related to information (data) segregation upon portable computing devices.

1.2 The Related Art

With the advent of a wide variety of portable computing devices, such as PDAs and smart phones, especially those owned by employees but used for business purposes, control over applications and information stored on portable computing devices has become more difficult for central information technology ("IT") departments. Many employees desire to use their own devices in performing their jobs for a number of reasons, including: the greater merging of work and home lives leading to a need to include both personal and work-related information on a single device to avoid using multiple devices (e.g., having two cell phones or PDAs), the higher degree of technical sophistication of the employee and their greater independence from the IT department, and the increasing use of technology as a means of self-expression. The trend towards "BYOD" ("bring your own device") creates a challenge for IT departments, not only for maintaining multiple device types and manufacturers, but for protecting sensitive data and access to data on secure servers.

Application programs use typically involves one or more types of data, such as configuration settings for the application, data to be manipulated or used by the application, or output from the application. (The term "data" is used herein to refer to any or all types of information associated with a specific application instance.) Regardless of ownership, portable computing devices often have a mix of enterprise and personal applications and information. It is difficult to maintain separation between enterprise information and personal information. In some cases, a portable computing device may also contain applications and information belonging to other entities, such as clubs, volunteer organizations, schools, etc. Therefore, it would be useful to have a mechanism that can establish and manage segregated application and information "domains" on portable computing devices, each such segregated domain encompassing a defined set of applications and information accessible within that domain; the domain being further associated with domain-specific policies as required for control over the applications and information that is part of the segregated domain.

Application programs ("apps") are typically run as "processes" on portable computing devices. Apps can be assigned various levels of resource usage, such as processor time or memory, by an operating system (OS) on the portable computing device. Applications call upon the OS or service daemons to provide various functions, such as access to data files or peripheral devices, network connections, inter-process communication, allocation of resources, etc. On some portable computing devices, these calls make direct reference to the OS. In other portable computing devices, these calls are made through dynamic or statically loaded library function calls, service processes, or other well-known methods. Applications running on portable computing devices may have OS-level protections applied to them (when these protections exist for the portable computing device). These OS-level protections provide access-controls to specific resource. These protections do not limit how applications can share information (they limit access, not usage), or how the data can be communicated and/or stored.

Some portable computing devices utilize virtualization technologies in which applications and data is segregated into disparate virtual machines. Applications implemented using virtualization techniques are isolated from each other and are unable to communicate and/or share information. In many cases, however, some level of sharing is desired, and virtualization does not provide a solution when information needs to be shared.

Even when a portable computing device has the capability to be configured so as to maintain applications and data separately, the problem of control of owned data is not solved. The application can only enforce required policies on the data for itself, while it is running. It can not prevent other applications from treating the data in ways that violate the data owner's policies, especially when it is not running. Application enforcement of owner policies is not persistent, or pervasive, and is therefore inadequate. For example, if a Post Office Protocol (POP) e-mail client were written to keep messages received from a first mail server separate from those received from a second mail server, and to permit forwarding of a message only through the mail server it was received from, there may be nothing to prevent a different e-mail client or a file transfer application from sending the stored messages or message files to a third server. Policy enforcement must be persistent and pervasive to be effective.

Current portable computing devices do not:
- Recognize a plurality of owners of the applications and data stored on the device,
- Provide for a combination of external and locally provided policy to define application and information segregation,
- Segregate applications and information in accordance with policy-defined control definitions,
- Provide mechanisms for persistent controls over applications and information subject to policy control,
- Provide mechanisms for fine-grained control over operations by and between applications operating on the device.

This combination of portable computing device attributes is not currently available. What is needed is a computing solution that isolates application information and provides distinct improvements over existing portable computing device architectures by dynamically enabling a plurality of policy controlled "domains", each comprising one or more applications and its information. The present invention meets these and other needs.

2 SUMMARY OF THE INVENTION

In a first aspect, the present invention provides a method for operating a computer data processing device in two or more data security domains. In one embodiment, the invention comprises providing in data memory associated with the computer data processing device at least one external provided policy defining at least one computer data processing device application and data domain; associating computer data processing device application and data with the at least one application and data domain; providing at least one persistent control mechanism over the computer data processing device application and data associated with the at least one application and data domain, the persistent control mechanism being subject to policies defined for the at least one application and data domain; and providing at least one mechanism for fine-grained policy-based control over operations by, and between, the computer data processing device application and data. More specific embodiments further comprise physically separating computer data processing application and data in a first domain from computer data processing application and data in a second domain; and still more specific embodiments still further comprise mediating communications between the computer data processing application in the first domain from the computer data processing applications in the second domain. Among the latter embodiments are those wherein applications in the first domain cannot communicate with applications in the second domain; and those wherein the mediating is provided dynamically in response to the providing the external provided policy.

Other embodiments further comprise assigning the domain dynamically using at least one domain determinant selected from the group consisting of: a pre-calculated determinant, a determinant stored with the computer data processing device application, a determinant store with the policy, and a determinant created when the request is issued by an application and is received by a request mediation module.

In another aspect the present invention provides a computer data processing device configured to operate securely in two or more data security domains. In some embodiments, the device comprises data memory associated with the computer data processing device holding at least one external provided policy defining at least one computer data processing device application and data domain; computer processor instructions effective to associate the computer data processing device application and data with the at least one application and data domain; computer processor instructions for receiving at least one persistent control mechanism over the computer data processing device application and data associated with the at least one application and data domain, the persistent control mechanism being subject to policies defined for the at least one application and data domain; and computer processor instructions for providing at least one mechanism for fine-grained policy-based control over operations by, and between, the computer data processing device application and data. More specific embodiments further comprise physically separating computer data processing application and data in a first domain from computer data processing application and data in a second domain. Still more specific embodiments further comprise mediating communications between the computer data processing application in the first domain from the computer data processing applications in the second domain. In yet more specific embodiments, applications in the first domain cannot communicate with applications in the second domain; and the mediating is provided dynamically in response to the providing the external provided policy. Still more specific embodiments are those further comprising assigning the domain dynamically using at least one domain determinant selected from the group consisting of: a pre-calculated determinant, a determinant stored with the computer data processing device application, a determinant store with the policy, and a determinant created when a request for a domain is received by the operating system of the computer data processing device.

In another aspect, the present invention provides a non-transitory computer-readable medium containing a computer program product for operating a computer data processing device, the computer program product being configured to enable the computer data processing device to operate securely in two or more data security domains, the computer program product being configured to enable the computer data processing device to perform actions comprise: receiving in data memory associated with the computer data processing device at least one external provided policy defining at least one computer data processing device application and data domain; associating computer data processing device application and data with the at least one application and data domain; providing at least one persistent control mechanism over the computer data processing device application and data associated with the at least one application and data domain, the persistent control mechanism being subject to policies defined for the at least one application and data domain; and providing at least one mechanism for fine-grained policy-based control over operations by, and between, the computer data processing device application and data. In more specific embodiments, the computer program product is further configured to enable the computer data processing device to separate physically computer data processing application and data in a first domain from computer data processing application and data in a second domain. In still more specific embodiments, the computer program product is further configured to enable the computer data processing device to mediate communications between the computer data processing application in the first domain from the computer data processing applications in the second domain. In yet more the computer program product is further configured to enable the computer data processing device to prevent applications in the first domain from communicating with applications in the second domain; the computer program product is further configured to enable the computer data processing device to mediate the communications dynamically in response to the providing the external provided policy.

In other more specific embodiments the computer program product is further configured to enable the computer data processing device to assign the domain dynamically using at least one domain determinant selected from the group consisting of: a pre-calculated determinant, a determinant stored with the computer data processing device application, a determinant store with the policy, and a determinant created when a request for a domain is received by the operating system of the computer data processing device.

These and other aspects and advantages will become apparent when the Description below is read in conjunction with the accompanying Drawings.

3 BRIEF DESCRIPTION OF THE DRAWINGS

The features of the present invention will best be understood from a detailed description of the invention and example embodiments thereof selected for the purposes of illustration and shown in the accompanying drawings in which.

4 DESCRIPTION OF SOME EMBODIMENTS OF THE INVENTION

4.1 Overview

Figure 1:
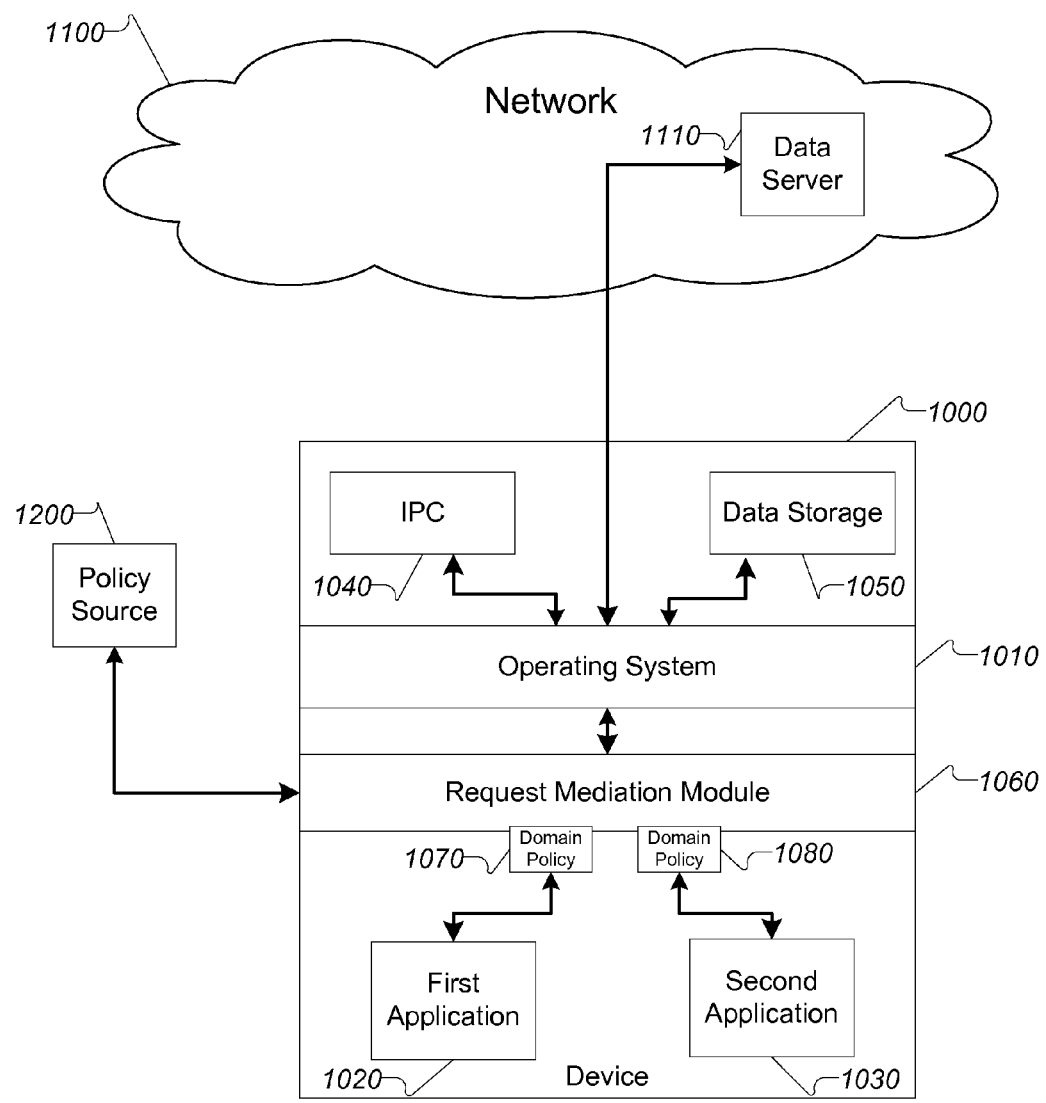
FIG. 1 is a diagram depicting a data processing device utilizing the invention and elements of its operating environment.

The system and methods of the inventions described herein provide capabilities for portable computing devices to:

Recognize a plurality of owners of the applications and data stored on the device, Provide for a combination of external and locally provided policies that specify application and information segregation into logical "domains", Associate applications and information with one or more "domains" in accordance with the policy-defined control specifications, Provide mechanisms for persistent control over applications and information associated with a domain subject to policies defined for that domain, Provide mechanisms for fine-grained policy-based control over data operations by and between applications operating on the device.

A domain is a persistent logical construct the describes the persistent segregation of applications and associated data, defined by at least part of a policy, which identifies one or more applications, their associated data, and permitted operations by those applications upon the associated data as well as communications with other applications in the domain and with applications and systems outside of the domain. A domain definition is provided by one or more policies and/or parts of a policy.

A given device can support an arbitrary number of domains simultaneously, each with its own policies, applications and data. An application can be recognized as belonging to a single domain, to a plurality of domains, or to no domains. For example, a given device might have a domain for an employer's data with associated applications permitted access to it, a domain for data belonging to a volunteer organization that the user works with, and personal data that is not associated with any domains. In a more complex situation, a consultant may be employed by several enterprises, each managing its own domain with its own policy on the consultant's device, without affecting the other domains.

In order to persistently create and enforce a domain's specified application and data segregation, the applications and data belonging to each domain are typically physically segregated from the applications and data of other domains, and communications between the domains is mediated. Applications in a first domain are not allowed to access (e.g. read, write, modify, create, or delete) applications or data belonging to a second domain.

Limiting applications in accordance with policy requires that the mechanisms used by applications to access or store data, such as reading or writing locally stored data, reading or writing remotely stored data over a network, sharing data with other applications locally or remotely by inter-process communication, or any other means, be mediated so as to ensure that only data access or storage requests made by an application that are in compliance with the associated domain policy are passed for service (execution), and that those requests that are not in compliance with the associated domain policy are not passed. In some instances, requests that are not in compliance may be modified to make them compliant with the associated domain policy, allowing the modified request to be passed for service.

One method for achieving this is to dynamically or statically associate applications and/or data with policy defined "domains". Methods for associating applications and data are described in more detail below.

Domains may be further defined based, for example, upon their required attributes, including, for example, the protection of persistent data at rest, connection limitations, etc. Domains that require segregation, persistent protected storage, or network isolation, are called "restricted". Those domains that do not have this requirement are called "unrestricted".

These and other aspects and advantages will become apparent when the Description below is read in conjunction with the accompanying Drawings.

4.2 Definitions

The following definitions are used throughout, unless specifically indicated otherwise:

| TERM | DEFINITION |
|---|---|
| Mediate | Mediation of operations includes the operations of permitting, blocking, or modification of at least one operation requested by an application instance. |
| Application | A program used by a user, e.g. e-mail, web browser, or contacts. |
| Application instance | An application, along with specific data associated with that application, such as configuration data, that is associated with a specific domain. |
| Application process | An executing copy of an application instance |

4.3 Exemplary System Architecture 4.3.1 Basic Architecture

FIG. 1 is a diagram showing a device (1000) with a request mediation module of an exemplary embodiment of the current invention (1060). A request mediation module (1060) is logically located between the operating system (OS) (1010), and the application instance, represented by a first application instance (1020) and a second application instance (1030). When an application instance (1020 or 1030) requests, using well known methods such as system calls, access to a resource capable of storing or transferring data, such as the local data storage (1050), inter-process communications (1040), or networked resources such as a data server (1110) accessed through a network (1100), the request is redirected to a request mediation module to determine proper handling based on the appropriate policy for the domain of the application (1070 & 1080). Other resources (not shown) that can be similarly mediated include shared or private volatile memory, wired communications and networking, wireless communication or networking interfaces, and any other aspects of the data processing device.

Note that in this description the term "operating system" (or "OS") is used to refer to the operating system kernel, as well as any device drivers, supporting services, or other device aspects required to carry out application requests.

Mediation modules use aspects of the domain of the requesting application, the domain the data belongs to, and the policies for the application and data's domain to determine how to mediate a request. Mediation of requests includes permitting the requested operation as it was requested, blocking the request completely (e.g. returning a failure result to the requestor), modifying at least one aspect of a requested operation before permitting the modified operation to proceed (e.g. altering a file name before permitting a file open request to proceed), or redirecting a request to a different function (e.g. changing a local file open request into an inter-process communication link open request). The operations, the applicable conditions, and mediation effects are defined within the policy. Requests to communicate between applications inter- or intra-domain may be similarly described and mediated using this system. Exemplary methods used by request mediation modules to intercept and mediate application requests varies with the design and requirements of the OS, as described below.

Request mediation modules may be pre-installed as part of initial device software loading, or be installed on the device at a later time and bound to the OS, or installed and/or bound with one or more applications. Request mediation modules that are part of the OS can be statically loaded at device boot time, or dynamically loaded as needed, depending on the needs and design of the OS. Request mediation modules that are bound with an application may be loaded with the application instance, or they may loaded the first time an application instance is requested. In some exemplary embodiments aspects of a request mediation module can be loaded as part of an application instance while other aspects of a request mediation module can be loaded as part of the OS.

Request mediation modules associate a domain with one or more application instances, and mediate one or more operations based on the policy specified for that application in that domain. Unlike traditional access controls and similar systems, request mediation modules may be associated with specific application instances, applications, data, operations, or other domain policy-defined items. Limiting the scope of the mediation to specific applications and operations (as opposed to system-wide limitations) makes the system more efficient and reduces the number of policy conflicts that must be resolved.

Request mediation modules intercept requests made by application instances and determine whether the requests are in compliance with relevant policies for the domain of the application and the data it is trying to access.

The policies used by the request mediation module are supplied by a policy source (1200). The policy source (1200) can be a network policy server, a removable storage device containing policy elements, a cache of policy elements located in local device storage or volatile memory, configuration settings made by the device user or other person with access to the device settings, or any combination of these or other means as determined to be appropriate by those with skill in the art. Policy information received by the request mediation module (1060) is applied to domains as specified by the policy source and/or the policy information by the request mediation modules.

4.3.2 Attachment to the Operating System

The specific mechanisms used to enable a request mediation module to intercept OS requests made by application instances depends on the design of the OS and the mechanisms used by applications to make requests. Some exemplary methods for typical OS designs are described below.

4.3.2.1 OS Embedding

In some exemplary embodiments, a request mediation module and its associated policy/domain association logic is embedded within the OS itself, and is called as a matter of course during the dispatch of OS calls from the application instance to the OS. The request mediation module may be linked into the OS, or may be dynamically loaded by the OS at boot time or as needed.

In some alternate embodiments, a request mediation module may be associated with a structure in the OS designed to support pluggable mediation modules. In the same manner as a file system driver, a request mediation module may register with the OS to receive specific OS calls and be passed those calls as needed.

4.3.2.2 OS Module Attachment

In exemplary embodiments for OSs that use system calls, whether made by pure software means, or with the assistance of special CPU hardware features, an exemplary mechanism is to use "vector hooking". This involves replacement or modification of one or more references to existing system calls in order to redirect OS calls to a replacement function or functions. The original pointers can be preserved for use by the replacement functions if the original functionality is required before, during, or after the processing done by the replacement functions. The specifics of how to use vector hooking on any given OS are well known to those with ordinary skill in the art.

In this exemplary embodiment of integrating a request mediation module with an OS, all OS functions that may be mediated (i.e. that can be referred to in policy for mediation) are replaced by references to mediation module functions. When invoked, mediation module functions examine each request in light of the policy associated with the domain of the requesting application, and then block the request, pass the request to the original OS function, modify the request before passing it to the original OS function, or redirect the request, or a modified version of it, to a different function.

4.3.2.3 Load-Time Intercept

In some exemplary embodiments, the application loader is modified to set up the redirection of application requests to a request mediation module at the time the application instance is loaded. This may be accomplished by the modified application loader "patching" the application during the load process, or by providing alternate service locations that reference a request mediation module. These can be provided using a "shim" application or loadable library that redefines the underlying system call entry points.

4.3.2.4 Application Modification

In other exemplary embodiments, the applications themselves may be modified to directly access a request mediation module.

4.3.2.5 Service Manager Attachment

In exemplary embodiments for OSs that use a service manager service to enable application instances to identify the services to call for various functions, a request mediation module is divided into at least two components: a secured service manager service and one or more secured services. The secured service manager service replaces the original OS service manager service.

When an application instance requests a pointer to a particular service from the secured service manager service, the secured service manager service decides, based on the application instance domain and its policy, whether to provide the application instance a pointer to a request mediation module secured service, or to the corresponding original OS service. In alternate exemplary embodiments, there can be a plurality of secured services that each provide the services for application instances in different domains.

The secured services can either provide the requested service themselves, block them, or modify the requests prior to sending them to the original OS services and optionally modify any responses returned from the original OS service to the application instance.

4.3.2.6 Shared Memory Attachment

In exemplary embodiments that use shared memory regions for communication between application instances and OS services, one method for intercepting requests is to replace, by means such as vector hooking, the portion of the OS service that receives notification of requests, and/or which reads requests from a shared memory buffer, with portions of a request mediation module.

When an application instance requests a function from the OS service, it writes a request description to a shared memory buffer. Then, optionally, it sends a notification to the OS service that a function is being requested. This notification can be, for example, an ioctl( ) call on a shared device, a signal, such as SIGUSR1 on a Unix-like system, a designated synchronization object such as a semaphore or a mutex, or other mechanism as will be well understood by those with skill in the art.

The notification is received by a security function that forms part of a request mediation module. The security function then reads and/or writes the shared memory to identify the request and mediate the request contained within it. The security function then optionally calls the requested service to process the request. Once request processing is complete, the security function of the request mediation module can modify the results recorded in the shared memory as required before alerting the requesting application instance or marking the shared memory to indicate that the request has been completed.

4.3.2.7 Messaging

In exemplary embodiments that use messaging or event queues for communication between application instances and OS services, one method for intercepting requests is to register to receive specific events placed on the event or message queue, perform mediation of those events received, and then forward the mediated events for further processing as required.

4.3.3 Storage Access

Access to stored data, whether local or networked, may be mediated by a request mediation module. Depending on policy for a domain, data may be stored as written by an application, it may be encrypted as it is written, and decrypted as it is read, in a manner that is transparent to the application instance making the read or write requests, or it may be modified in other ways as it is read or written. The specifics of how this is done will vary with the method of inserting a request mediation module so as to enable it to intercept requests.

4.3.3.1 OS Module Attachment

Figure 3:
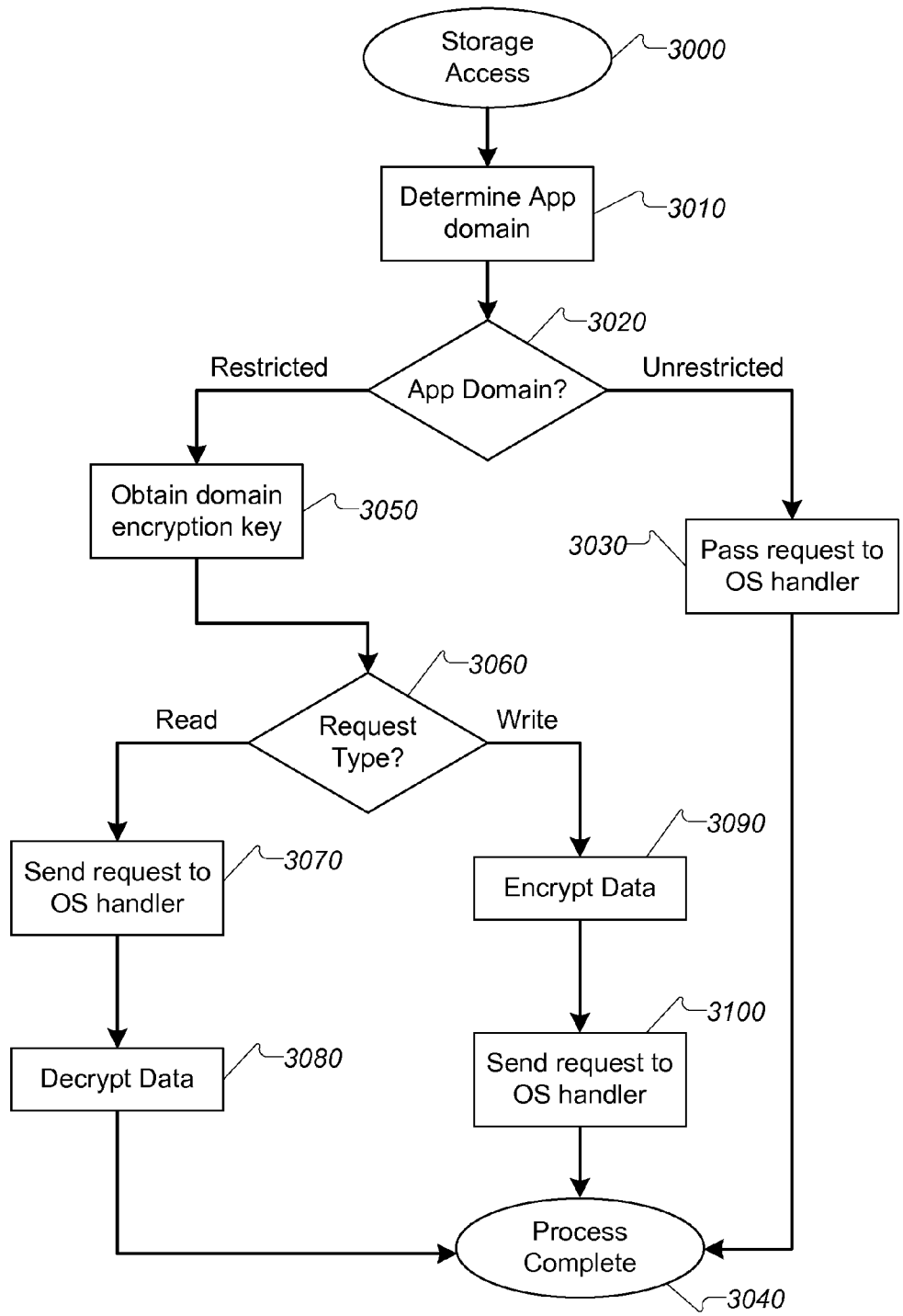
FIG. 3 depicts a flowchart of an exemplary method for accessing data in a domain.

When using the OS module attachment method, requests for storage access are sent from application instances, and intercepted by a request mediation module. The request mediation module uses a method such as the method described in FIG. 3 (3000) to mediate the request.

The first step is to determine the domain of the application (3010). If the application instance is associated with a domain that does not require restrictions (3020), the policy permits the request mediation module to forward the request to the storage handler of the OS (3030) and the process is complete (3040).

If the application instance is associated with a domain that requires data on a persistent storage media to be encrypted, the request mediation module retrieves the domain encryption/decryption key (3050). This can be obtained from a local key cache, from the policy source (e.g. a policy or policy server), or by other means as will be known to those with skill in the art. The request type (read or write) is checked (3060). If the request is a read request (3060), the request mediation module sends the request to the OS handler (3070) to obtain the encrypted data, and then decrypts the data (3080), and returns it to the calling application instance, which completes the process (3040). If the request is a write, the request mediation module encrypts the data (3090) and then sends the request to the OS handler (3100) which stores the encrypted data, which completes the process (3040).

4.3.3.2 Process Marking Attachment

When using the process marking attachment method, when the classification module decides that an application instance is associated with a restricted domain, it causes the OS to set up a secured process its own name space for mounted file systems. It then mounts a secured file system that encrypts all information stored on it from within this secured process name space.

When the secured process accesses the storage system, the file request dispatcher in the OS sees that it is attempting to read/write to a file on a secured file system and routes the request through the secured file system module, which automatically takes care of any encryption on writes or decryption on reads.

4.3.3.3 Service Manager Attachment

When using the service manager attachment method, and an application requests a pointer to a service from the secured service manager service, that service identifies the application domain, and provides a pointer to the appropriate domain storage service, whether restricted or unrestricted, as required by the policy of the identified domain. When the application accesses the domain storage service, the service can encrypt and decrypt information, send written information to a remote service for backup purposes, etc as required by the domain policy. It also forwards requests, with optional modifications, to the original OS storage service.

4.3.4 Network Access

Access to networks is mediated by a request mediation module. Depending on policy for a domain, data may be sent as requested by an application, or it may be redirected, modified, or restricted in a manner that is transparent to the application instance making the network requests. The specifics of how this is done will vary with the method of inserting a request mediation module so as to enable it to intercept network operation requests.

4.3.4.1 OS Attachment

When using the OS module attachment method, if a request mediation module determines that an application instance is associated with an unrestricted domain, it allows network requests by the application instance to pass unmodified to the OS network handler.

If a request mediation module determines that an application instance is associated with a restricted domain, it modifies network requests by the application instance before passing them to the OS network handler. These modifications can encrypt the data, change the destination address to a VPN gateway, or perform other modifications as required by the restricted domain policy.

4.3.4.2 Process Marking Attachment

The exact method used to perform process marking attachment for network access depends on the OS configuration. In the preferred implementation, for Unix-like OSs, the OS comprises the iptables package (http://www.netfilter.org/) and the iproute2 package (http://www.linuxfoundation.org/collaborate/workgroups/networking/iproute2).

When an application instance associated with a restricted domain requests network access, the request is processed by the OS and eventually reaches the iptables firewall module. This module, in addition to other processing, can mark a packet based on the identity of the process that sent it. For example, Netfilter, the kernel side of iptables, can match packets and connections to processes/users (using the OWNER module), and it can mark packets (the MARK module) or connections (the CONNMARK) module. It can later act upon those marks when making filtering decisions, and the routing subsystem can act upon them when making routing decisions.

After iptables has finished processing the packet, the packet is further processed by the OS and is sent to the iproute2 module which determines routing for the packet. Based on the packet marking from iptables and the destination IP address, the iproute2 module determines which network interface is used to handle the packet. A first network interface is provided by the OS and sends information without encrypting it. A second network interface may be a tunneling interface, which encrypts the packet data and then sends it though the OS interface to a counterpart interface for decryption and further processing.

4.3.4.3 Service Manager Attachment

When using the service manager attachment method, when an application requests a pointer to a service from the secured service manager service, that service identifies the application domain, and provides a pointer to the appropriate domain network service. When the application accesses the domain network service. That service can encrypt and decrypt messages and determine their routing based on the policy requirements of the domain.

In the case of domains when network connections to external services are mediated, the domain network service can modify the destinations of requests to reference a VPN gateway within the domain owner's private network. Network requests to destinations other than the VPN gateway may be modified to request the VPN gateway, or may be blocked. This ensures that restricted domain applications can only use network access to connect to the domain owner's private network.

Alternatively, it is possible to configure a domain network service to allow access only to a white list of destinations, or to block access to a blacklist of destinations.

4.4 Policy

A policy for a domain may control the system's response to one or more operations requested by an application. A policy is not required to specify mediation for all operations that can be requested by an application. Policies will typically specify mediation only for those operations that require mediation. For example, a request for access to current local time data will not generally require mediation, but a request to open a data file for reading generally will.

Policies for a domain are specified by the owners of the data associated with the domain. In some cases this will be the device user, in other cases it may be the device owner, and in yet other cases it can be another independent entity, such as an enterprise Information Technology (IT) department. In some exemplary embodiments, applications and data can exist on a device without being associated with a domain. There is no mediation of requests for such "ownerless" data, and whatever policy configuration has been done for the device itself will apply.

4.4.1 Policy Flow

In some exemplary embodiments, policy is supplied by a policy source (FIG. 1, 1200), such as a policy server. In a first exemplary embodiment, policies are loaded to the device when a request mediation module on the device connects to the policy source to obtain a policy to implement. Alternatively, a policy may be loaded to the local policy source on the device using a policy definition application, or by copying the policy to the device using techniques well understood to the device user.

A policy for a specific domain, domain/application, and/or domain/device combination may be set by the owning entity for the domain. An owning entity for the domain may be the owner of the device, the provider of an application and/or data, or a third party such as the device owner's employer's IT department.

In some embodiments, this policy can be modified by the data processing device's owner. In other embodiments, the policy may not be modified by a device owner.

4.5 Application Classification

A data processing device can contain a plurality of applications. In a preferred embodiment there can be a plurality of domains for a given device. In a first exemplary embodiment, there are two domains: corporate (in an exemplary embodiment, restricted) and personal (e.g. unrestricted). Restricted domain applications require a high level of security for the data they work with, and define data and application segregation requirements. Unrestricted domain applications require less security, and more flexibility. The domain determination for an application is made by a request mediation module as described below.

There are two options for performing this application classification. The first is "late classification", where the request mediation module classifies applications just prior to execution. The second is "early classification", where the request mediation module classifies applications at the time they are installed on the device, with the possibility that they can be reclassified if a policy obtained from the policy source changes.

Figure 2:
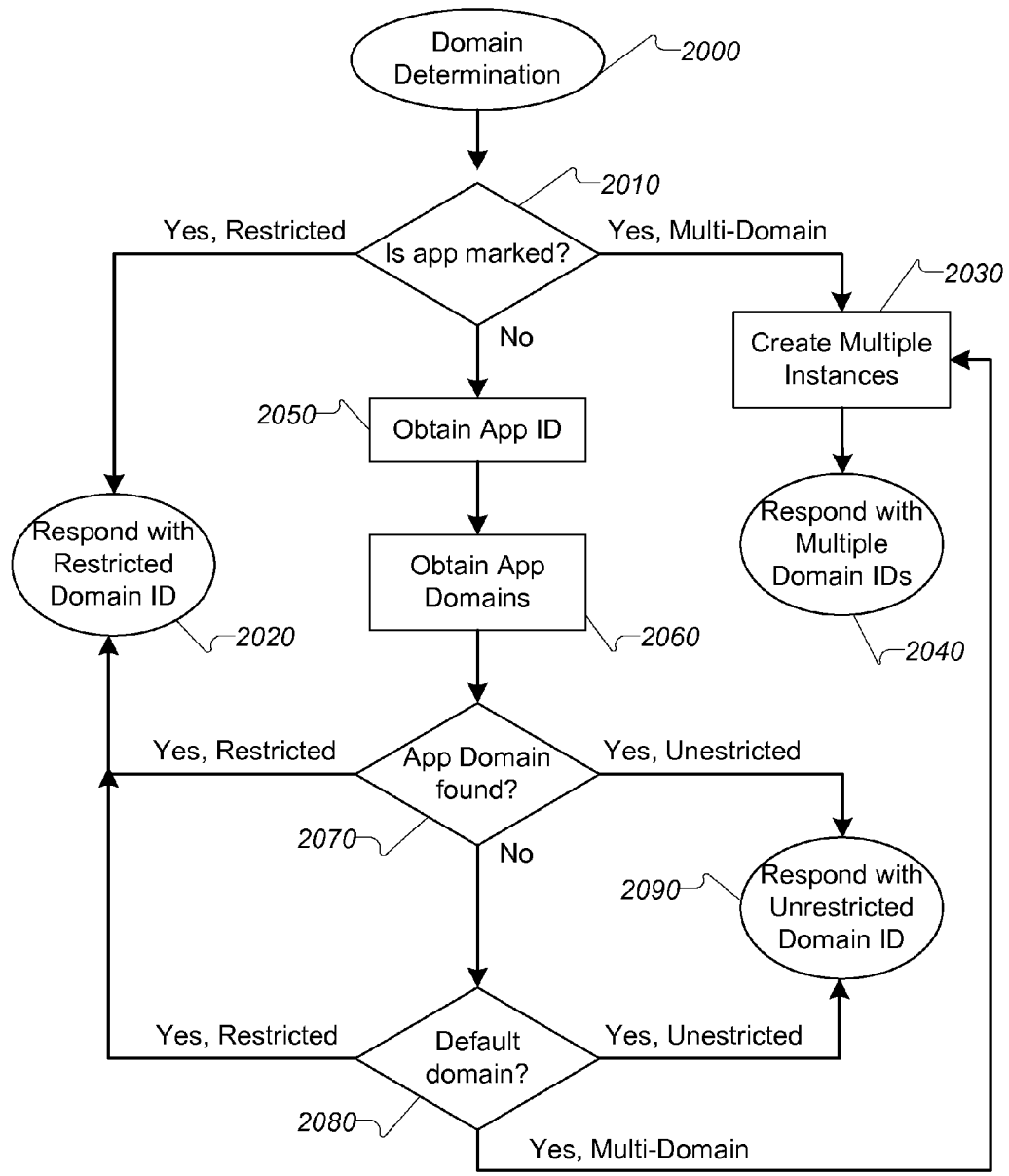
FIG. 2 depicts a flowchart of an exemplary method for determining the domain or domains of an application.

FIG. 2 is a flowchart that describes a method for determining the domain of an application. This application domain classification method (2000) is carried out by a request mediation module. The first step is to check whether the application is marked as to domain (2010). This marking can be done, for example, using permissions on platforms based on Java, Access Control Labels (ACLs) on platforms that support them, or by other means. If the application is marked as restricted (2010), the application is classified as restricted and the process is complete (2020). If it is marked as dual purpose (i.e. usable for both domains), the application is classified as dual purpose, multiple instances are created (2030), one for each domain, and the process is complete (2040).

If the application is not marked at all, the next step is to obtain the application ID (2050). The application ID can comprise a cryptographic check-sum of the application, the application's certificate in the case of a signed application, or any other unique indicator associated with the application. The request mediation module then uses the application ID to obtain the domain or domains associated with the application (2060). The information can be obtained by checking available policies for known domains to see which specify membership for the application, by checking with a policy server, by use of some aspect of the application ID as a lookup key in a table of domains, or by any other means deemed useful by those with skill in the art. If the application is in the restricted domain (2070), that information is returned, and the process is complete (2020). If the application is in the unrestricted domain (2070), that information is returned, and the process is complete (2090). If the application is in both domains (2070), multiple instances are created (2030), the list of domains is returned and the process is complete (2040).

If a domain for the application is not found (2070), for example if the policy source does not have a policy that specifies the particular application, the request mediation module can, in some exemplary embodiments, use a default domain specified by policy, if one is defined (2080). This default domain, again, can be restricted, unrestricted, or multiple domain, with appropriate responses being returned (2020, 2090, or 2040).

If the application is defined as multiple domain, the request mediation module may create multiple instances of that application. Each application instance is placed in one of the domains, so the various instances cannot communicate with each other, unless the policy permits it. The domain environment comprises any data files, configuration settings, saved cache, etc.

4.5.1 Persistent Association of Application Instances to Domains

In some embodiments, the results of a classification process may be persistently stored within a policy (modifying the policy), or may be stored within the request mediation module or its data.

4.5.2 Process Marking Attachment

In some exemplary embodiments, applications and/or application instances may have the domain to which they belong stored within the application instance itself. The application classification process (above) results are captured and stored within the application and/or its data, and are made available to a request mediation module during subsequent calls. Early classification results and cached copies of late classification results may be handled in this manner.

In some exemplary embodiments, an exemplary method involving process marking can be used. When using this mechanism, the request mediation module uses another method, such as vector hooking, to link a classification module (which can be a part of a request mediation module) to the operating system (or application) so as to have it invoked at an appropriate stage of application instance instantiation, or other point in application instance processing prior to the application instance attempting to access a mediated resource. The classification module classifies the application instance as to the domain it is associated with using the domain determination procedure described below. The classification is then recorded in the application instance, in information associated with the application instances, or in the application instance process state within the OS. When the application instance makes a request that requires mediation, the request mediation module determines (based on the recorded classification), whether to transfer the request to the standard OS service module, or to a request mediation module where it is further processed. In either case, execution returns to the application instance when request handling is complete.

It will be recognized by those skilled in the art that, while the invention has been described above in terms of preferred embodiments, it is not limited thereto. Various features and aspects of the above described invention may be used individually or jointly. Further, although the invention has been described in the context of its implementation in a particular environment, and for particular applications (e.g. corporate data protection), those skilled in the art will recognize that its usefulness is not limited thereto and that the present invention can be beneficially utilized in any number of environments and implementations where it is desirable to control access to and use of data by use of policies. Accordingly, the claims set forth below should be construed in view of the full breadth and spirit of the invention as disclosed herein.

What is claimed:

1. A method for operating a computer data processing device having an operating system in two or more data security domains, comprising:
   providing in data memory associated with said computer data processing device at least one external policy defining at least one computer data processing device application and data domain;
   associating said at least one computer data processing device application and data with said at least one domain;
   providing at least one persistent control mechanism over said computer data processing device application and data associated with said at least one application, said persistent control mechanism being subject to policies defined for said at least one domain, said policies being application-specific, user-specific, or data-specific, and said persistent control mechanism being separate from said operating system and said persistent control mechanism being configured to intercept requests from said computer data processing device application to said operating system; and
   providing at least one mechanism for fine-grained policy-based control over operations by and between, said computer data processing device application and data.

2. The method of claim 1, further comprising replacing or modifying a reference to a system call using said persistent control mechanism to redirect said system call to at least one replacement function.

3. The method of claim 2, further comprising providing said persistent control mechanism in the form of a secured service manager service that replaces the operating system service manager service.

4. The method of claim 3, further comprising providing at least one secured service using said secured service manager service.

5. The method of claim 4, wherein said data processing device uses messaging queues or event queues, said messaging queues or event queues including one or more specific events, and said method further comprises intercepting requests by said persistent control mechanism.

6. The method of claim 5, further comprising registering at least one specific event, mediating said at least one specific event, and forwarding said at least one specific event for additional processing.

7. The method of claim 1, further comprising providing access to a network for said persistent control mechanism.

8. The method of claim 1, further comprising determining that an application instance is associated with a restricted domain, causing said operating system establish a secured process in its own name space for mounted file systems, and mounting a secured file system that encrypts all information stored thereon.

9. A computer data processing device having an operating system in two or more data security domains, comprising:
   data memory associated with said computer data processing device including at least one external policy defining at least one computer data processing device application and data domain;
   computer processor instructions effective to associate said computer data processing device application and data with said at least one domain;
   computer processor instructions effective for providing at least one persistent control mechanism over said computer data processing device application and data associated with said at least one application, said persistent control mechanism being subject to policies defined for said at least one domain, said policies being application-specific, user-specific, or data-specific, and said persistent control mechanism being separate from said operating system and said persistent control mechanism being configured to intercept requests from said computer data processing device application to said operating system; and computer processor instructions effective for providing at least one mechanism for fine-grained policy-based control over operations by and between, said computer data processing device application and data.

10. The computer data processing device of claim 9, further comprising computer processor instructions effective for replacing or modifying a reference to a system call using said persistent control mechanism to redirect said system call to at least one replacement function.

11. The computer data processing device of claim 10, further comprising computer processor instructions effective for providing said persistent control mechanism in the form of a secured service manager service that replaces the operating system service manager service.

12. The computer data processing device of claim 11, further comprising computer processor instructions effective for providing at least one secured service using said secured service manager service.

13. The computer data processing device of claim 12, wherein said data processing device uses messaging queues or event queues, said messaging queues or event queues including one or more specific events, and computer data processing device further comprises computer processor instructions effective for intercepting requests by said persistent control mechanism.

14. The computer data processing device of claim 13, further comprising computer processor instructions effective for registering at least one specific event, mediating said at least one specific event, and forwarding said at least one specific event for additional processing.

15. The computer data processing device of claim 9, further comprising computer processor instructions effective for providing access to a network for said persistent control mechanism.

16. The computer data processing device of claim 9, further comprising computer processor instructions effective for determining that an application instance is associated with a restricted domain, causing said operating system to establish a secured process in its own name space for mounted file systems, and mounting a secured file system that encrypts all information stored thereon.

17. A non-transitory computer-readable medium containing a computer program product for operating a computer data processing device, said computer program product being configured to enable said computer data processing device to operate securely in two or more data security domains, and said computer program product being configured to enable said computer data processing device to perform actions comprising:

receiving in data memory associated with said computer data processing device at least one external policy defining at least one computer data processing device application and data domain;

associating said computer data processing device application and data with said at least one domain;

providing at least one persistent control mechanism over said computer data processing device application and data associated with said at least one application, said persistent control mechanism being subject to policies defined for said at least one domain, said policies being application-specific, user-specific, or data-specific, and said persistent control mechanism being separate from said operating system and said persistent control mechanism being configured to intercept requests from said computer data processing device application to said operating system; and providing at least one mechanism for fine-grained policy-based control over operations by and between, said computer data processing device application and data.

18. The non-transitory computer readable medium of claim 17, being further configured to enable said computer data processing device to perform actions comprising replacing or modifying a reference to a system call using said persistent control mechanism to redirect said system call to at least one replacement function.

19. The non-transitory computer readable medium of claim 18, being further configured to enable said computer data processing device to perform actions comprising providing said persistent control mechanism in the form of a secured service manager service that replaces the operating system service manager service.

20. The non-transitory computer readable medium of claim 19, being further configured to enable said computer data processing device to perform actions comprising providing at least one secured service using said secured service manager service.

21. The non-transitory computer readable medium of claim 20, wherein said data processing device uses messaging queues or event queues, said messaging queues or event queues including one or more specific events, and said non-transitory computer readable medium further comprises computer program instructions configured to enable said computer data processing device to intercept requests by said persistent control mechanism.

22. The non-transitory computer readable medium of claim 21, being further configured to enable said computer data processing device to perform actions comprising registering at least one specific event, mediating said at least one specific event, and forwarding said at least one specific event for additional processing.

23. The non-transitory computer readable medium of claim 17, being further configured to enable said computer data processing device to perform actions comprising providing access to a network for said persistent control mechanism.

24. The non-transitory computer readable medium of claim 17, being further configured to enable said computer data processing device to perform actions comprising determining that an application instance is associated with a restricted domain, causing said operating system establish a secured process in its own name space for mounted file systems, and mounting a secured file system that encrypts all information stored thereon.

* * * * *